(12) United States Patent
Gill et al.

(10) Patent No.: US 8,364,174 B2
(45) Date of Patent: Jan. 29, 2013

(54) SYSTEM AND METHOD FOR RAN ASSISTED LOCATION UPDATE

(75) Inventors: Harleen K. Gill, San Diego, CA (US); Eric Carl Rosen, Solana Beach, CA (US); Ashu Razdan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1168 days.

(21) Appl. No.: 12/118,569

(22) Filed: May 9, 2008

(65) Prior Publication Data

US 2009/0280834 A1    Nov. 12, 2009

(51) Int. Cl.
*H04Q 7/20* (2006.01)
(52) U.S. Cl. ............ 455/456.5; 455/456.1; 455/456.2; 455/456.3; 455/450; 455/414.2; 370/329; 370/330; 370/332; 370/337; 370/347; 370/348
(58) Field of Classification Search ............ 455/456.1, 455/433, 428, 456.5, 456.2, 456.3, 418, 450; 709/223; 370/347, 328, 341, 346, 445, 329, 370/330, 332, 337, 348, 338; 726/1
See application file for complete search history.

(56) References Cited

U.S. PATENT DOCUMENTS

| | | | | |
|---|---|---|---|---|
| 6,480,476 | B1 * | 11/2002 | Willars | 370/311 |
| 7,420,947 | B2 * | 9/2008 | Sendonaris et al. | 370/335 |
| 2004/0157619 | A1 * | 8/2004 | Corson et al. | 455/456.1 |
| 2005/0159142 | A1 * | 7/2005 | Giniger et al. | 455/414.3 |
| 2006/0258371 | A1 | 11/2006 | Krishnamurthi et al. | |
| 2008/0170555 | A1 * | 7/2008 | Tsunehara et al. | 370/342 |
| 2009/0113244 | A1 * | 4/2009 | Doshi et al. | 714/25 |
| 2009/0181647 | A1 * | 7/2009 | Benco et al. | 455/413 |

FOREIGN PATENT DOCUMENTS

| | | |
|---|---|---|
| JP | 2002534688 A | 10/2002 |
| JP | 2006524472 A | 10/2006 |
| JP | 2009513036 | 3/2009 |
| KR | 100553543 B1 | 2/2006 |
| WO | 2004092762 | 10/2004 |
| WO | 2005079002 | 8/2005 |
| WO | WO2007002303 | 1/2007 |

OTHER PUBLICATIONS

International Search Report, PCT/US2009/042654, International Searching Authority, European Patent Office, Oct. 5, 2009.
Written Opinion, PCT/US2009/042654, International Searching Authority, European Patent Office, Oct. 5, 2009.

* cited by examiner

*Primary Examiner* — Patrick Edouard
*Assistant Examiner* — Fred Casca
(74) *Attorney, Agent, or Firm* — Raphael Freiwirth (57) ABSTRACT

An apparatus and method for efficiently updating location information of a mobile device in a wireless communication network, such as a cellular network, is disclosed. The mobile device sends a location message over an access channel. The wireless communication device continually transmits a location message at periodic intervals without regards to the status of the base station in communication with the wireless communication device. The base station determines a timeslot in which to receive a location message transmitted by the wireless communication device. If more than one wireless communication device is transmitting a location message, the base station prioritizes the order in which to receive the location message, opening the first available timeslot to the higher priority wireless communication device. A high priority device may be a wireless communication device used by emergency services personnel, such as firefighters or the police.

20 Claims, 7 Drawing Sheets

SYSTEM AND METHOD FOR RAN ASSISTED LOCATION UPDATE

BACKGROUND OF THE INVENTION

1. Field of the Invention

The invention relates to wireless communications, and more particularly, to robustly updating the location of a wireless device within a wireless telecommunication system.

2. Description of the Related Art

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as the "TIA/EIA-95-B Mobile Station-Base Station Compatibility Standard for Dual-Mode Wideband Spread Spectrum Cellular System" (the IS-95 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), the standard offered by a consortium named "3rd Generation Partnership Project 2" (3GPP2) and embodied in a set of documents including "C.S0002—A Physical Layer Standard for cdma2000 Spread Spectrum Systems," the "C.S0005—A Upper Layer (Layer 3) Signaling Standard for cdma2000 Spread Spectrum Systems," and the "C.S0024 cdma2000 High Rate Packet Data Air Interface Specification" (the cdma2000 standard), and other standards. To the extent as known to one of skill in the art, these named standards are incorporated herein by reference.

Call setup is the process of establishing dedicated physical channels and negotiating service configuration parameters between a mobile station and a base station so that communication can take place. Call setup procedures fall into two classes. Mobile station originated call setup occurs when a mobile station user makes a call. Mobile station terminated call setup occurs when a call is made to the mobile station.

Call setup procedures involve signaling between a mobile switching center (MSC) or packet data service node (PDSN), one or more base stations (BS), and a mobile station (MS). As used herein, the term base station can be used interchangeably with the term access point. The term mobile station can be used interchangeably with the terms subscriber unit, subscriber station, access terminal, remote terminal, or other corresponding terms known in the art. The term mobile station encompasses fixed wireless applications. Signals from the mobile station are known as the reverse link, reverse channel, access channel, or reverse traffic. Signals to the mobile station are known as the forward link, forward channel, paging channel, or forward traffic.

Each step in the call setup procedures just described contributes to the call setup latency. Call setup latency, or the time required to set up a call, is an increasingly important parameter in wireless system design as data use becomes more prevalent. Modern wireless data communication systems offer "always on" connectivity. As those skilled in packet-switched network design know, "always on" connectivity does not mean a physical channel is permanently dedicated to a specific user. This would be bandwidth inefficient, and unlikely to be cost-effective for subscribers. Instead, when a mobile station engages in data communications, a call is setup to allow one or more packets to be transmitted, and then the call is torn down to free up the channel for another user. In a typical data communication session, calls will be set up and torn down repeatedly, with call setup latency occurring during each call. Naturally, decreasing call latency, while important in voice communications as well, is very important to provide a compelling user experience to the wireless data user.

Each step, described above, introduces latency due in part to the time required to transmit each message, and in part due to the processing time required to receive each message and determine the appropriate next step. Furthermore, much of the call setup signaling occurs on common channels which are shared by a number of mobile stations and a base station. As such, a component of the call setup latency is introduced when a mobile station must make repeated attempts to gain access to the common channel (known as the access channel). Furthermore, a message for a particular mobile station may have to be queued with messages for other mobile stations, yet another source of latency in performing the steps described above.

The latency issues of call setup may be compounded when the call setup occurs for a large group of wireless access terminals which are co-located within a small geographical area of a radio access network. As the number of access terminals in a particular geographic area increase, the time required to respond to a call setup request by the access terminals naturally increases because of the sudden, increased communications on the traffic channel. This may result in a sudden, uncontrolled request by a sufficient number of access terminals requesting call setup, called an ACK implosion. Maintaining the location of access terminals in a sector helps to reduce the probability of an ACK implosion.

Figure 3:
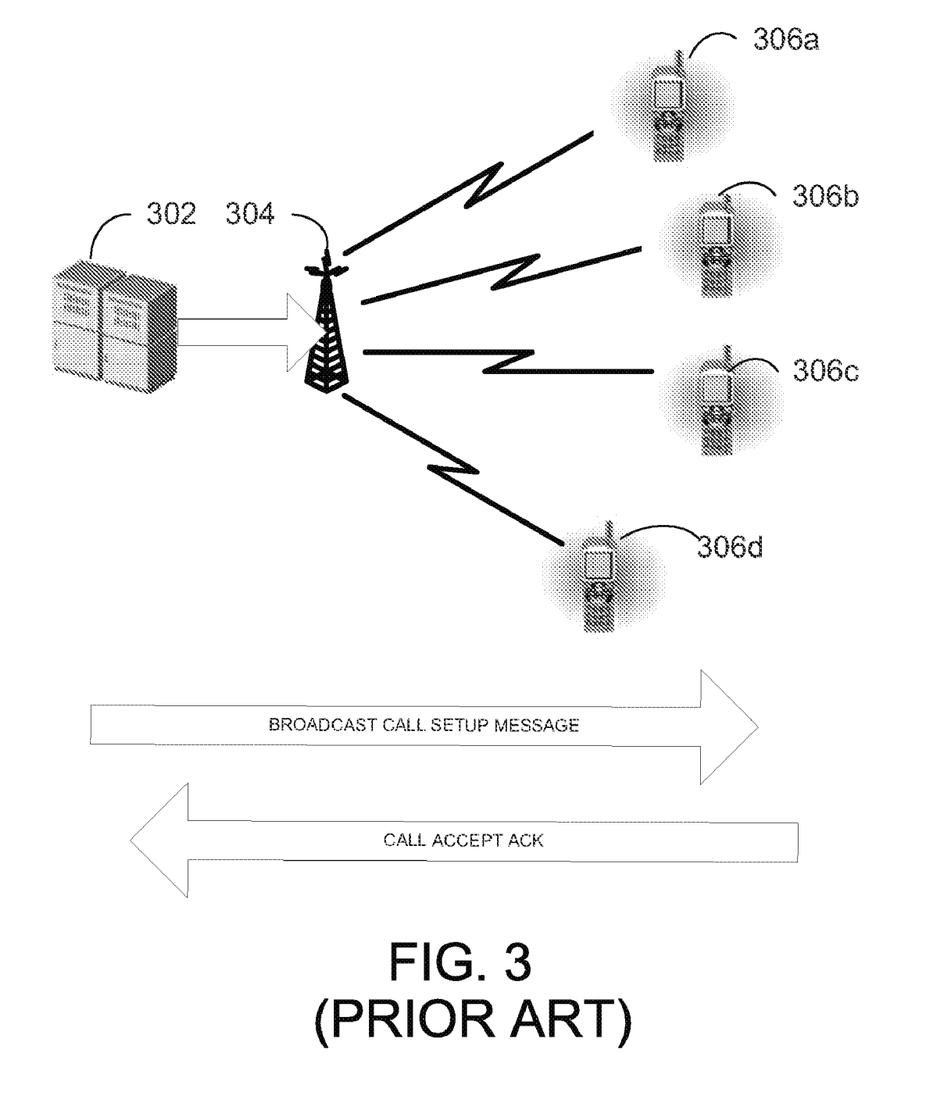
FIG. 3 is an exemplary prior art wireless communication system illustrating an ACK implosion scenario.

As illustrated in FIG. 3, ACK implosion, as known in the prior art, resulting from a significant number of ACK responses to a call setup broadcast message may increase the collision probability on the access channel, thus increasing the latency, or wait time, for a call setup. Typically, a collision occurs when a device attempts to broadcast a packet during the same time that another device is broadcasting a packet. In FIG. 3, BS 302 broadcasts a call setup message via transceiver 304 to MS 306a-d. MS 306a-d may transmit a call setup ACK message back to BS 302 at nearly the same time, thus possibly resulting in an ACK implosion situation. If the ACK messages are transmitted at or nearly within the same time frame, the collision probably may be high, thus possibly resulting in multiple packet collisions. These multiple packet collisions may reduce the number call accept ACK messages sent by MS 306a-d that are received by BS 302. BS 302 may then need to re-broadcast the call setup message.

As described, call setup latency is formed through multiple message transmissions and corresponding acknowledgements, the length of each message, and the associated processing required with each message. Call setup latency is one cause of delay that is undesirable in many communication applications: voice communications as well as data communications. To the extent that multiple calls must be setup during a communication session, a typical scenario with data, the delay introduced is exacerbated.

This phenomenon causes an increase in the call setup times as the response to the call setup message is delayed. Scenarios in which a large group of wireless access terminals respond to a call setup message, in which the terminals are co-located within a small, geographic location, may include emergency situations such as public safety and disaster recovery operations. These scenarios call for effective and quick establishment of traffic channels for a large set of mobile devices. Latencies incurred during call setups for these large groups are as critical a metric as the efficiency in transporting media between these devices. Maintaining and updating the location of the mobile station may significantly reduce or eliminate the collision probability.

There is therefore a need in the art to update the location of mobile stations to reduce call setup latency.

SUMMARY OF THE INVENTION

The apparatus and method described herein enables efficient location updating from mobile stations. The efficiency is achieved by:

a. Location messages are transmitted continuously by the wireless communication device
b. Allowing the base station to determine a timeslot in which to receive one of the location messages from the wireless communication device
c. Allowing the base station to prioritize between receiving a location message from more than one wireless communication device.
d. The wireless communication device continually transmitting location updates regardless of status of base station controller.

In one embodiment, there is provided a method to update the location of a first wireless communication device including steps to register the first wireless communication device with a location assist server, receiving a first location message from the first wireless communication device, wherein the first wireless communication device transmits a location message in predetermined intervals, determining from the first location message an initial location for the first wireless communication device, determining a first timeslot in which to receive a second location message from the first wireless communication device, allocating a second location message from the first wireless communication device, and updating the location assist server with the location of the first wireless communication device from the second location message. or a wireless communication device to update the location of the wireless device using a common channel, preferable the access channel. The first location message can be in a first format, and an intermediate computer device, such as a base station, can change the first format into a second format and then transmit the first location message in a second format to the location assist server.

In another embodiment, a system can include a first wireless communication device, wherein the first wireless communication device is configured to transmit a location message at pre-determined intervals over an access channel, a location assist server, wherein the first wireless communication device is registered with the location assist server, and a first base station configured to receive a first location message from the first wireless communication device over the access channel, wherein the first base station is further configured to determine a first timeslot in which to receive the first location message. In a situation in which a base station is receiving location updates from wireless communication devices associated with emergency services, the locations updates of those wireless devices may receive a high priority. By prioritizing emergency wireless communication devices high, the collision probability may be reduced, thus decreasing the call setup latency for these emergency wireless mobile devices.

In a still further embodiment, a computer-readable medium may include instructions to register a wireless communication device with a location assist server, to receive a first location message from the wireless communication device, wherein the wireless communication device transmits a location message in pre-determined intervals, determine from the first location message an initial location for the wireless communication device, determine a first timeslot in which to receive a second location message from the wireless communication device, receive a second location message from the first wireless communication device, update the location assist server with the location of the first wireless communication device from the second location message.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "access terminal," "wireless device,", "wireless communication device", "mobile device," and "mobile station" are used interchangeably. The terms "call" and "communication" are also used interchangeably. The term "application" as used herein is intended to encompass executable and non-executable software files, raw data, aggregated data, patches, and other code segments. The term "exemplary" or "configuration" means that the disclosed element or embodiment is only an example, and does not indicate any preference of user. Further, like numerals refer to like elements throughout the several views, and the articles "a" and "the" includes plural references, unless otherwise specified in the description. Various functions of the present disclosure may be integrated into a single component or into separate components. The present disclosure is not limited to any particular configuration of components supporting the functions described herein.

Figure 1:
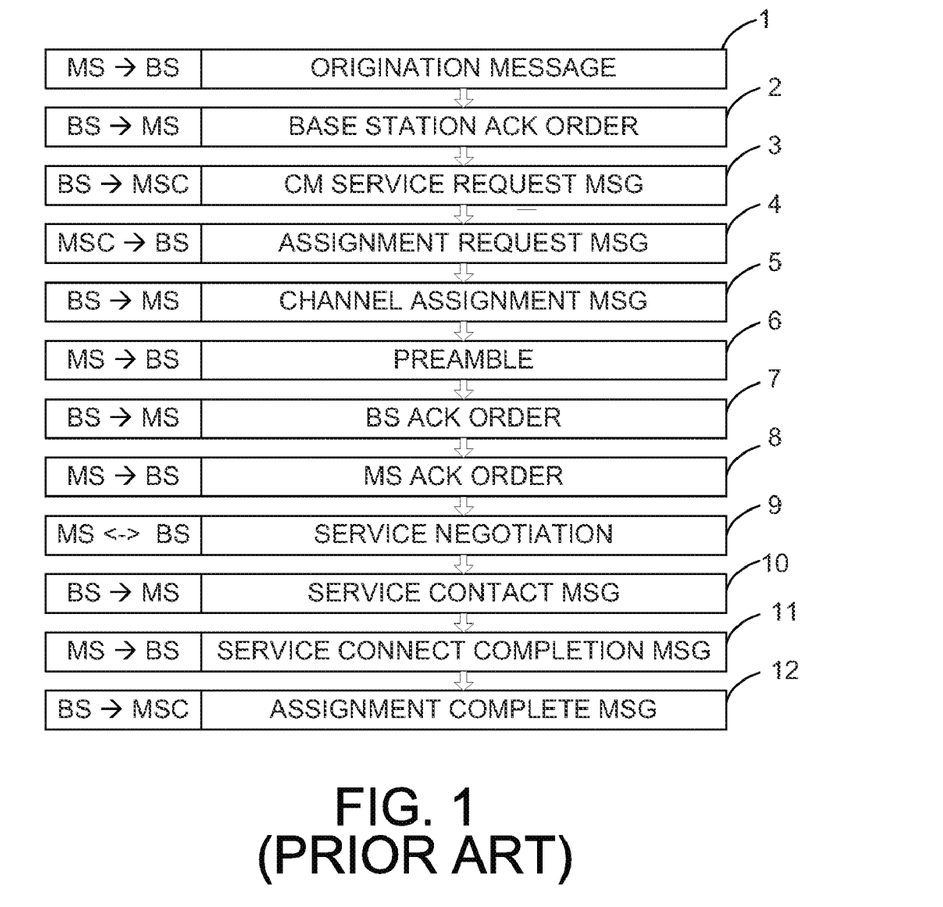
FIG. 1 is an exemplary prior art mobile station originated call setup procedure.

FIG. 1 depicts a prior art mobile station originated call setup procedure as defined in Release A of the cdma2000 standard. In step 1, the mobile station sends an Origination Message 1 to the base station. This message indicates to the network that the mobile station user wants to make a call. It contains dialed digits and a service option number to indicate the type of call (i.e. voice, data, etc.). A list of pilot signals from neighboring base stations that have been received at the mobile station with sufficient strength are also included in this message, so that the base station can determine which pilots to include in the active set.

In step 2, upon successfully receiving the Origination Message 1, the base station sends a Base Station Acknowledgement Order 2 to the mobile station. This message acknowledges the receipt of the Origination Message 1.

In step 3, the base station sends a Connection Management (CM) Service Request Message 3 to the MSC, which triggers the MSC to setup the call. This message contains relevant information received from the mobile station in the Origination Message 1.

The MSC responds with an Assignment Request Message 4 to the base station in step 4. This message indicates to the base station to setup the radio channel. However, the base station has the option of setting up the radio channel as soon as the Origination Message 1 is received.

Note that in this figure, as well as in those figures described below, the order in which the Assignment Request Message 4 is delivered from the MSC to the base station in relation to other message deliveries is somewhat flexible. The Assignment Request Message 4 will be sent from the MSC to the base station after the MSC receives the CM Service Request Message 3 (for mobile station originated call setup) or the Paging Response Message 25 (for mobile station terminated call setup, described below). The Assignment Request Message 4 comes before the base station sends the Service Connect Message 10 to the mobile station, described below.

In step 5, the base station sends a Channel Assignment Message 5 to the mobile station. The standard also defines an Extended Channel Assignment Message. As defined herein, the Channel Assignment Message 5 represents either message. This message assigns a dedicated physical channel to the mobile station for the purpose of carrying the user traffic associated with the call. It includes the relevant information for all pilots in the active set of the mobile station. After this step, the mobile station enters the traffic state.

In step 6, upon receiving the Channel Assignment Message 5, and after receiving two consecutive good frames on the forward link, the mobile station sends a preamble to the base station to help the base station acquire the reverse link signals from the mobile station. Once the reverse link has been acquired, the base station sends the Base Station Acknowledgement Order 7 to the mobile station in step 7. Upon receiving the Base Station Acknowledgement Order 7, the mobile station sends the Mobile Station Acknowledgement Order 8 to the base station in step 8 to indicate that the mobile station has acquired the forward link being transmitted by the base station.

Now the dedicated physical channels have been successfully set up. In step 9, a service negotiation procedure takes place between the mobile station and the base station to determine the format of information transfer. Examples of negotiated items include frame rate, frame type, transmission rates, and type of traffic (i.e. voice or data, vocoder rate if applicable). Some items are specified by the base station and therefore non-negotiable (e.g. mapping of logical channels to physical channels). Negotiation may involve multiple exchanges of Service Request Messages and Service Response Messages between the mobile station and the base station. The information exchanged is contained in a Service Configuration information record The final negotiation message sent, in step 10, is a Service Connect Message 10 from the base station to the mobile station. Both the Service Configuration information record and a Non-Negotiable Service Configuration information record are sent. The standard also allows the General Handoff Direction Message or the Universal Handoff Direction Message to be sent instead of the Service Connect Message in situations where a radio handoff becomes necessary while service negotiation is in progress.

In some instances service negotiation, step 9, can be avoided. If the mobile station is to use a previously stored service configuration, the base station simply sends a Service Connect Message 10, step 10, with an indication to use the previously stored service configuration. In the standard, this corresponds to setting the USE_OLD_SERV_CONFIG flag to '01'.

In step 11, upon receiving the Service Connect Message 10, the mobile station sends a Service Connect Completion Message 11 to the base station to indicate that it has accepted the proposed service configuration. Upon receiving the Service Connect Completion Message 11, in step 12, the base station sends an Assignment Complete Message 12 to the MSC to indicate that the base station has successfully set up the call.

After step 10, the Service Connect Message 10, the service configuration specified by the message takes effect. Now the call setup is complete and user traffic (i.e. voice or data) between the mobile station and the base station can flow. The traffic will flow between the base station and the MSC (for voice calls) or between the base station and the PDSN (for packet data calls) after step 12, the Assignment Complete Message 12.

Figure 2:
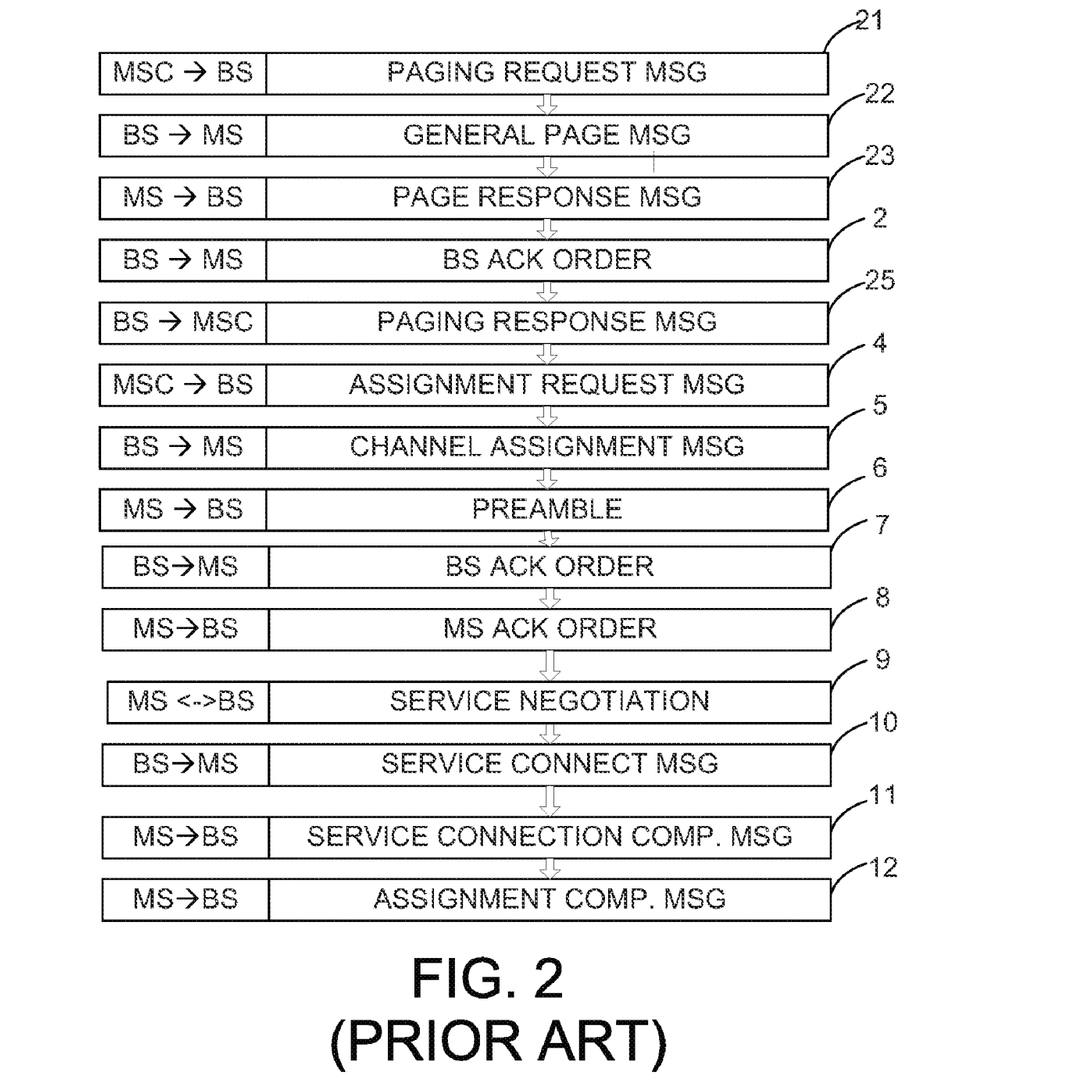
FIG. 2 is an exemplary prior art mobile station terminated call setup procedure.

FIG. 2 depicts a prior art mobile station terminated call setup procedure as defined in Release A of the cdma2000 standard. First, the MSC sends a Paging Request Message 21 to the base station to indicate a call is incoming to the mobile station. Second, a General Page Message 22 is sent from the base station to the mobile station. The standard also identifies a Universal Page Message, whose function is similar to the General Page Message 22, and the latter term will be used throughout to indicate either message. This message may be sent out over one or more sectors. This message indicates to the mobile station that it is receiving a call, and the Service Option number corresponding to the call.

Third, upon receiving the General Page Message 22, the mobile station sends a Page Response Message 23 to the base station, including the list of pilots, similar to that described in Origination Message 1 above, so that the base station can determine the appropriate active set. Fourth, upon successfully receiving the Page Response Message 23, the BS sends a Base Station Acknowledgment Order 2 to the mobile station, as described in step 2 with respect to FIG. 1 above. This message acknowledges receipt of the Page Response Message 23.

Fifth, the base station sends a Paging Response Message 25 to the MSC, which triggers the MSC to set up the call. The subsequent steps shown in FIG. 2 correspond to the like-numbered steps and messages described in steps 4 through 12 above with respect to FIG. 1.

Figure 4:
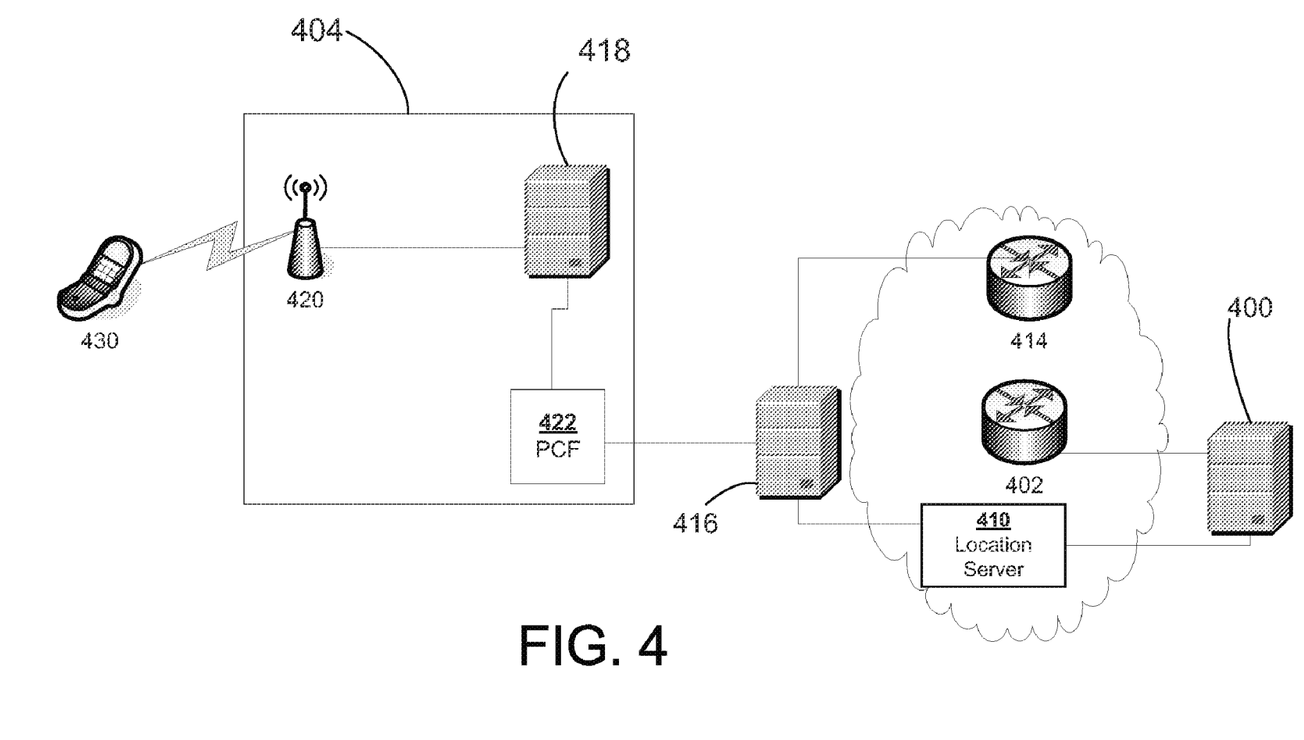
FIG. 4 is an exemplary wireless communication system configured to update the location of a mobile station.

For example, FIG. 4 is an exemplary and non-limiting example of a wireless system configured to receive location messages from a wireless communication device. Shown are application server 400, which monitors and maintains the location of mobile device 430. Wireless device 430 is preferably in communication with base station 404 having base station controller 418. Base station 404 communications to and from mobile device 430 is provided for by base station transceiver 420. Base station 404 also has packet control function 422 which routes packet data between mobile device 430 and PDSN 416. PDSN 416 is in communication with application server 400 through router 414 and 402, preferably communicating via the internet using appropriate protocols.

As mobile device 430 moves from one sector of a cell to another, mobile device 430 transmits a location update message to base station 404. There are various methods for determining the location change of mobile device 430. In one exemplary and non-limiting example, the mobile device detects a change in the active set information, such as a base station specific pilot PN offset and power control signal. In another exemplary and non-limiting example, the mobile device may detect a change in registration policies such as zone-based or timer-based registration. These and other changes may be detected due to various conditions, including the handoff of mobile device 430 from base station 404 to another base station (not shown). Other methods may be used for detecting the change of mobile device 430 from one sector to another.

To provide for location update information of mobile device 430 to application server 400, location assist server 410 may be used. Location assist server 410 is preferably in communication with application server 400 and PDSN 416 through the internet, though other communication methods may be used. Preferably, location assist server 410 communicates with application server 400 through an out-of-band connection, i.e. one different than the communication connection between PDSN 416 and application server 400.

Thus, it can be seen that, in one embodiment, the location update messages from the mobile device 430 (in CDMA2000, EV-DO or other standards as known in the art) that are received by the base station 404 are small, spectrally efficient packets that are wireless standard-specific. Here, once the base station 404 receives these wireless standard-specific location update messages, the location information can be translated (PN, sector ID, etc.) to a location identifier that is wireless standard independent, such as the exact location of the terminal using triangulation or GPS info, or the location of the base station itself, and passes this to the location assist server 410 using a transport mechanism, such as an IP datagram.

In operation, when a user powers up mobile device 430, mobile device 430 registers with application server 400 as well as location assist server 410 and PDSN 416. The registration may be done out of band after the traffic channel is up. The registration needs to be done once per PPP session and can be done using an open protocol such as Session Initiation Protocol. Preferably, the information of location assist server 410 is registered on PDSN 416 using LCP/NCP protocols or by forcing a PPP re-negotiation. While idle, mobile device 430 continuously sends location messages to base station controller 418 using a common channel, preferably the access channel. Use of the access channel in which to send location messages reduce the bandwidth on traffic channels. These location messages help wireless device 430 to maintain the radio link with the base station controller and also allow base station controller 418 to track the location of wireless device 430.

Figure 5:
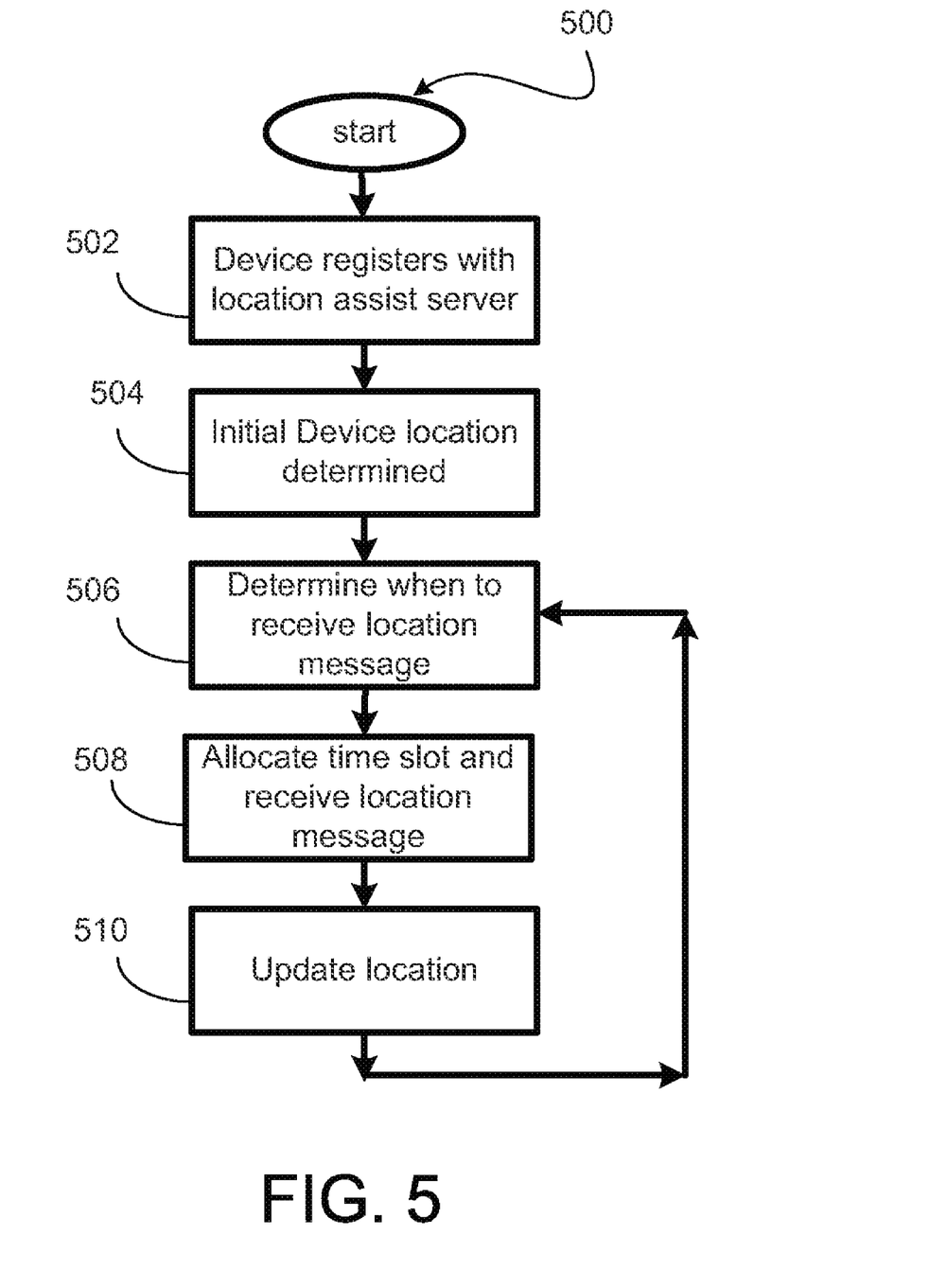
FIG. 5 is another exemplary wireless communication system configured to update the location of a mobile station.

FIG. 5 is an exemplary and non-limiting method 500 of updating the location of a wireless communication device, such as wireless communication device 430 of FIG. 4. A base station, such as base station 404 of FIG. 4, determines a timeslot in which to receive the location message transmitted periodically by wireless communication device 430. First, wireless communication device 430 registers 502 with a location assist server, such as location assist server 410 of FIG. 4. The registration process may occur according to various protocols. An initial location for the wireless communication device 430 is determined 504 upon registration of wireless communication device 430. Although the present subject matter is not limited to any particular means of registration, when wireless communication device 430 registers with location assist server 410, which is also in communication with a PDSN, such as PDSN 416 of FIG. 4, the location of wireless communication device 430 is typically determined.

At this point, wireless communication device 430 commences transmission of a location message on the access channel at periodic intervals. As used herein, the term "predetermined" when used in reference to message transmission means that the wireless communication device 430 employs any predictable algorithm for transmitting location data, including those that might not employ regular or equal periodic intervals. The intervals may vary according to system requirements, such as access channel use and battery power of the device. Once wireless communication device 430 commences predetermined transmission of location messages, the message will preferably continue without regard to the status of base station 404. For example, if base station 404 fails, it may be preferable for wireless communication device 430 to continue transmission of the location message to be used by another base station, such as base station 608a of FIG. 6, that may receive control of the device.

Because wireless communication device 430 continuously transmits a location message over the access channel, in order to potentially accommodate a large number of devices within a small location, base station 404 determines 506 when to allocate a timeslot in which to receive, or accept, the location message. If, based upon some a pre-determined criteria, such as an emergency condition, base station 404 determines that a location message from wireless communication device 430 is to be accepted, base station 404 allocates 508 a timeslot in which to receive the message. Once the location message is received, the location of wireless communication device 430 is updated 510. The process continues until base station 404 is no longer in control of wireless communication device 430.

Sometimes, a base station may fail or the wireless device may be handed off to another base station due to the changing location of the wireless device. In an emergency situation, a base station may lose all power for a period of time. The devices controlled by the base station are preferably handed off to another base station in the vicinity. Because the devices are preferably configured to continuously transmit their location message regardless of the status of the base station, the base station that will receive control of the devices may receive location messages of the devices prior to the handoff. Knowing the location of the devices prior to the handoff may reduce the load on the new base station to update the location assist server because the base station may not need to allocate time slots initially as the location is previously known.

Figure 6:
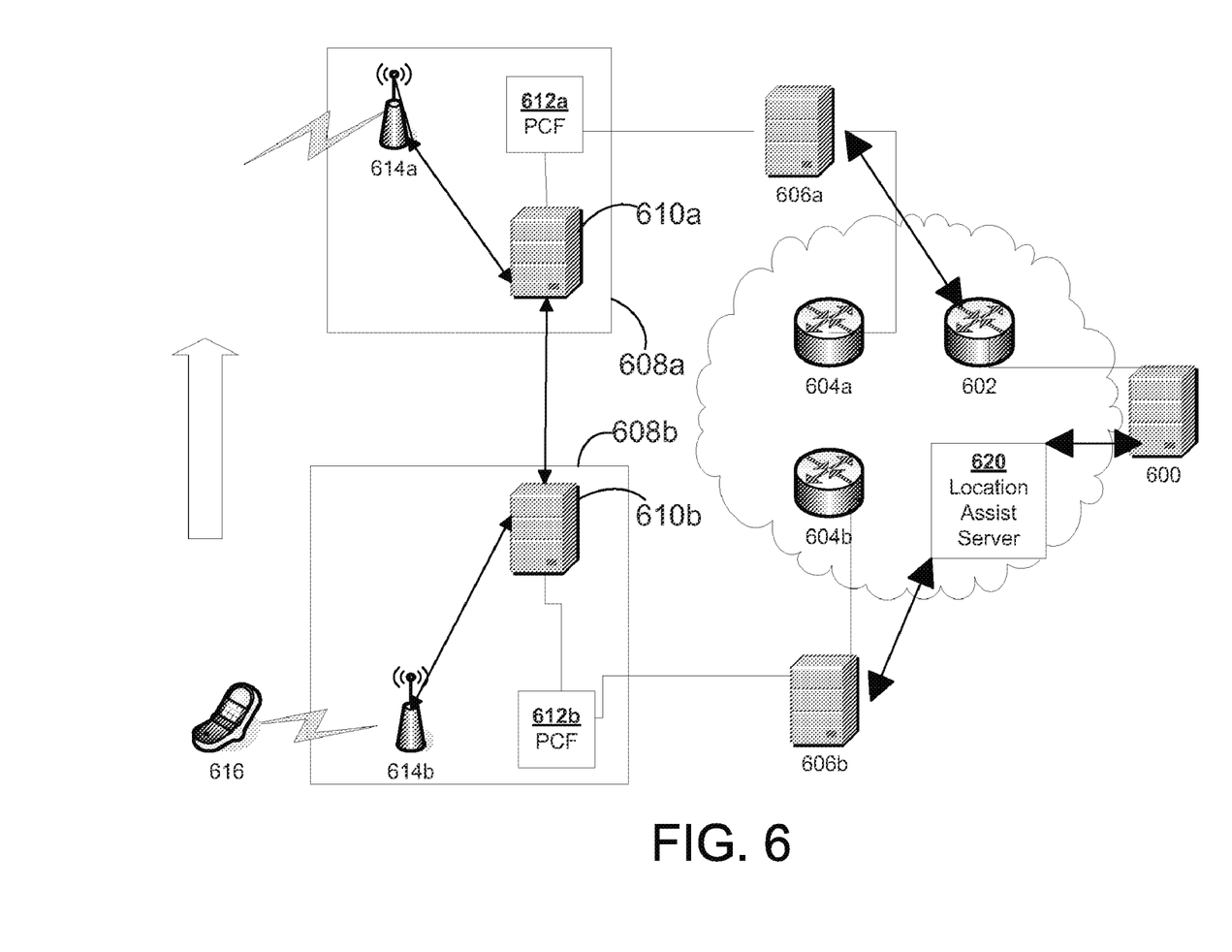
FIG. 6 is an exemplary method for updating the location of a mobile station.

FIG. 6 is an exemplary and non-limiting system that may be implemented to handle a base station handoff. Mobile communication device 616 is initially in communication with base station 608b through wireless transceiver 614b. Location messages transmitted from device 616 are sent by base station controller 610b through packet control function (PCF) 612b to PDSN 606b. PDSN 606b is in communication with application server 600 through router 604b. The location of device 616 is maintained by location assist server 620, which is separate from and in communication with PDSN 606b and application server 600. Device 616 initially registers with location assist server 620 and an initial location is determined. Location assist server 620 provides location updates to application server 600 when the location message is received from device 616 that indicates a change in location.

If base station 608b fails or no longer is able to handle communication duties, or if device 616 moves into another sector, device 616 is handed off to base station 608a. Base station 608a uses transceiver 614a to communicate with device 616. Communications received by transceiver 614a are sent to base station controller 610a, which in turn sends the communication to PCF 612a. PCF 612a is in communication with PDSN 606a. Unlike in the communication pathway of base station 608b, PDSN 606a may also serve as the location assist server for the base station, i.e. PDSN 606a and the location assist server are an integral unit. Location messages received from device 616 are transmitted to PDSN/location assist server 606a.

Figure 7:
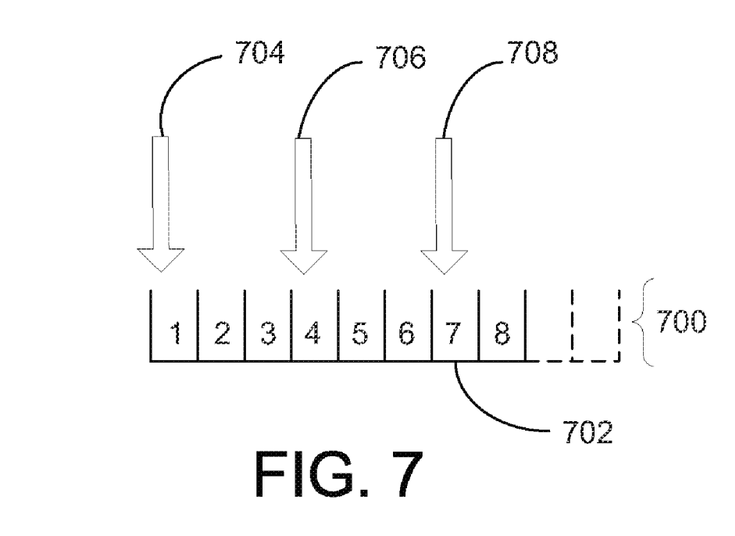
FIG. 7 is another exemplary method for updating the location of a mobile station.

FIG. 7 illustrates the aspect of determining a timeslot in which to allocate to a location message received from a wireless communication device. Shown are a base station's, such as base station 404 of FIG. 4, reception time slots 700 (1-8). Base station 404 may allocate any or all of the time slots to a particular device, such as wireless communication device 430 of FIG. 4, or a number of devices. Wireless communication device 430 continuously transmits location messages over the access channel. Wireless communication device 430 and base station 404 are preferable synched, i.e. both are operating on the same timing.

After registering with a location assist server, such as location assist server 410 of FIG. 4, wireless communication device 430 commences transmitting location messages to base station 404. Shown are messages 704-708. These messages are periodic and occur without a prompt from base station 404. Base station 404 then determines when to receive a location message. In FIG. 7, base station 404 has determined that a location message from wireless communication device 430 will be received at timeslot 7, thus the timeslot is allocated to wireless communication device 430. Once the location message is received, the timeslot is preferably reopened, as the timeslot allocation is preferably not a permanent allocation.

If two or more devices are transmitting location messages at the same time, thus competing for a time slot, base station 404 may need to determine which location message to receive in a particular timeslot. Base station 404 may prioritize the reception of the location message various ways. For example, to reduce call setup latency, the location of devices associated with emergency services, such as wireless communication devices used by firemen or policemen, may have more allocated timeslots than a wireless communication not associated with an emergency service. Thus, if an emergency situation occurs, if the location of the emergency devices have been updated within the sector or from sector to sector, the call setup latency may be reduced for these important devices.

Figure 8:
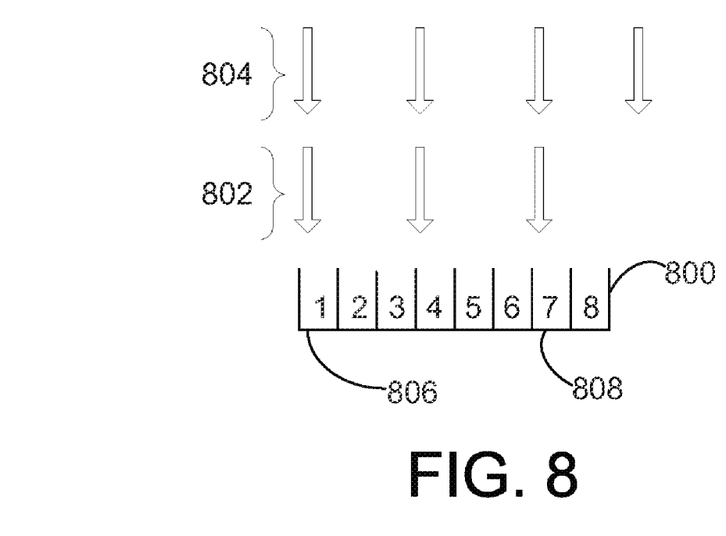
FIG. 8 is an exemplary call flow when updating the location of a mobile station.

FIG. 8 is an illustrative time slot allocation for two devices. As shown, a base station, such as base station 404, has time slot allocations 800 (1-8). Two devices, such as wireless communication devices 306a and 306b of FIG. 3, are synched with base station 404 and are sending their location updates in the same time frame. Base station 404 may not be able to receive the two messages simultaneously, so base station 404 determines when to receive each. If periodic location messages, shown as messages 804, from an emergency device, for example wireless communication device 306a, and periodic location messages, shown as messages 802, from a non-emergency device, such as wireless communication device 306b, are transmitted at the same time, base station 404 may determined that location messages 804 should have priority of reception over location messages 802. Thus, base station 404 may allocate time slot 1 of allocations 800 for receipt of the first periodic location message from the emergency wireless communication device 306a and time slot 7 for the third periodic message from non-emergency wireless communication device 306b.

In a broad sense, the system and methods optimize communication between exemplary wireless communication device 430 and exemplary base station 404. In view of the method being executable on a base station controller's computer device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

Methods described herein may be implemented, for example, by operating portion(s) of the wireless network, such as a wireless communications device or the server, to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, and it should be understood that the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method of updating the location of a first wireless communication device, comprising:
   registering the first wireless communication device with a location assist server;
   receiving an initial location message from the first wireless communication device, wherein the first wireless communication device transmits a location message in predetermined periodic intervals;
   determining from the initial location message an initial location for the first wireless communication device;
   registering a second wireless communication device with the location assist server, wherein the second wireless communication device is configured to transmit a location message at predetermined periodic intervals;
   allocating a first timeslot in which to receive a first location message from the first wireless communication device, and a second timeslot in which to receive a second location message from the second wireless communication device, wherein the first timeslot and second timeslot are determined by a base station based on prioritizing receiving the first location message and the second location message;
   receiving the first location message from the first wireless communication device;
   receiving the second location message from the second wireless communication device; and determining that the first location message is received in the first timeslot and updating the location assist server with the location of the first wireless communication device from the first location message.

2. The method of claim 1, wherein the base station receives the initial location message and the first location message.

3. The method of claim 1, wherein the initial location message and the first location message are received by two different base stations.

4. The method of claim 1, wherein the initial location message and the first location message are transmitted over an access channel.

5. The method of claim 1, wherein the receipt of the location messages is prioritized based upon an emergency condition.

6. The method of claim 1, further comprising receiving pilot signal strength information and signal-to-noise ratio information related to the first wireless communication device.

7. The method of claim 1, further comprising:
upon receiving the initial location message, changing a format of the initial location message from a first format to a second format; and
transmitting the initial location message in the second format to the location assist server.

8. A system for updating the location of a wireless communication device, comprising:
a first wireless communication device, wherein the first wireless communication device is configured to transmit a first location message at a predetermined interval over an access channel;
a location assist server, wherein the first wireless communication device is registered with the location assist server; and
a second wireless communication device, wherein the second wireless communication device is registered with the location assist server, and wherein the second wireless communication device is configured to transmit a second location message at a predetermined interval over the access channel;
a first base station configured to:
determine a first timeslot in which to receive the first location message;
determine a second timeslot in which to receive the second location message;
determine the temporal order of the first timeslot and the second timeslot; and
receive the first location message from the first wireless communication device over the access channel.

9. The system of claim 8, wherein the temporal order is based upon an emergency condition.

10. The system of claim 8, further comprising a second base station, wherein the second base station is configured to determine a timeslot in which to receive a third location message from the first wireless communication device.

11. The system of claim 8, wherein the first wireless communication device is configured to transmit the first location message without regard to the status of the first base station.

12. The system of claim 8, wherein the first base station is further configured to determine a third timeslot in which to receive a third location message from the first wireless communication device.

13. The system of claim 12, wherein the location assist server is configured to update the location of the first wireless communication device based upon a comparison of the first location message and at least the third location message.

14. The system of claim 8, further comprising an intermediate computer device that is configured to:
receive the first location message;
change the first location message from a first format to a second format; and
transmit the first location message in the second format to the location assist server.

15. A non-transitory computer-readable storage medium having stored thereon processor-executable instructions configured to cause a processor of a base station to perform operations comprising:
registering a first wireless communication device with a location assist server via the processor of the base station;
receiving an initial location message from the first wireless communication device at the base station, wherein the first wireless communication device transmits location messages in predetermined periodic intervals;
registering a second wireless communication device with the location assist server via the processor of the base station, wherein the second wireless communication device transmits location messages at predetermined periodic intervals;
determining from the initial location message an initial location for the first wireless communication device at the base station;
determining, via the processor of the base station:
a first timeslot in which to receive a first location message from the first wireless communication device; and
a second timeslot in which to receive a second location message from the second wireless communication device,
wherein determining the first and second timeslots comprises prioritizing receiving the first location message and receiving the second location message;
receiving the first location message from the first wireless communication device at the base station;
receiving the second location message from the second wireless communication device at the base station; and
updating, via the processor of the base station, the location assist server with a location of the first wireless communication device from the first location message.

16. The non-transitory computer-readable storage medium of claim 15, wherein the stored processor-executable instructions are configured such that the first location message and the second location message are received by the base station from an access channel of a wireless communication network.

17. The non-transitory computer-readable storage medium of claim 15, wherein the stored processor-executable instructions are configured to cause the processor of the base station to perform operations further comprising receiving a PN offset or a power control signal.

18. A base station configured to:
accept an initial location message from a first wireless communication device, wherein the wireless communication device is registered with a location assist server, wherein the first wireless communication device is configured to transmit a location message at predetermined periodic intervals to the base station;
determine from the initial location message an initial location for the first wireless communication device;
determine a first timeslot in which to accept a first location message from the first wireless communication device;
accept the first location message from the first wireless communication device;

update the location assist server with the location of the first wireless communication device from the first location message;

determine a second timeslot in which to accept a new location message from one of the first wireless communication device and a second communication device, wherein the base station is configured to determine the second timeslot by determining a priority for accepting the first location message and the new location message; and accept the new location message from the first wireless communication device or from the second communication device based on the determined priority.

19. The base station of claim 18, wherein the initial location message and the first location message are transmitted over a common channel.

20. The base station of claim 19, wherein the common channel is an access channel.

\* \* \* \* \*